Figures 1, 2:
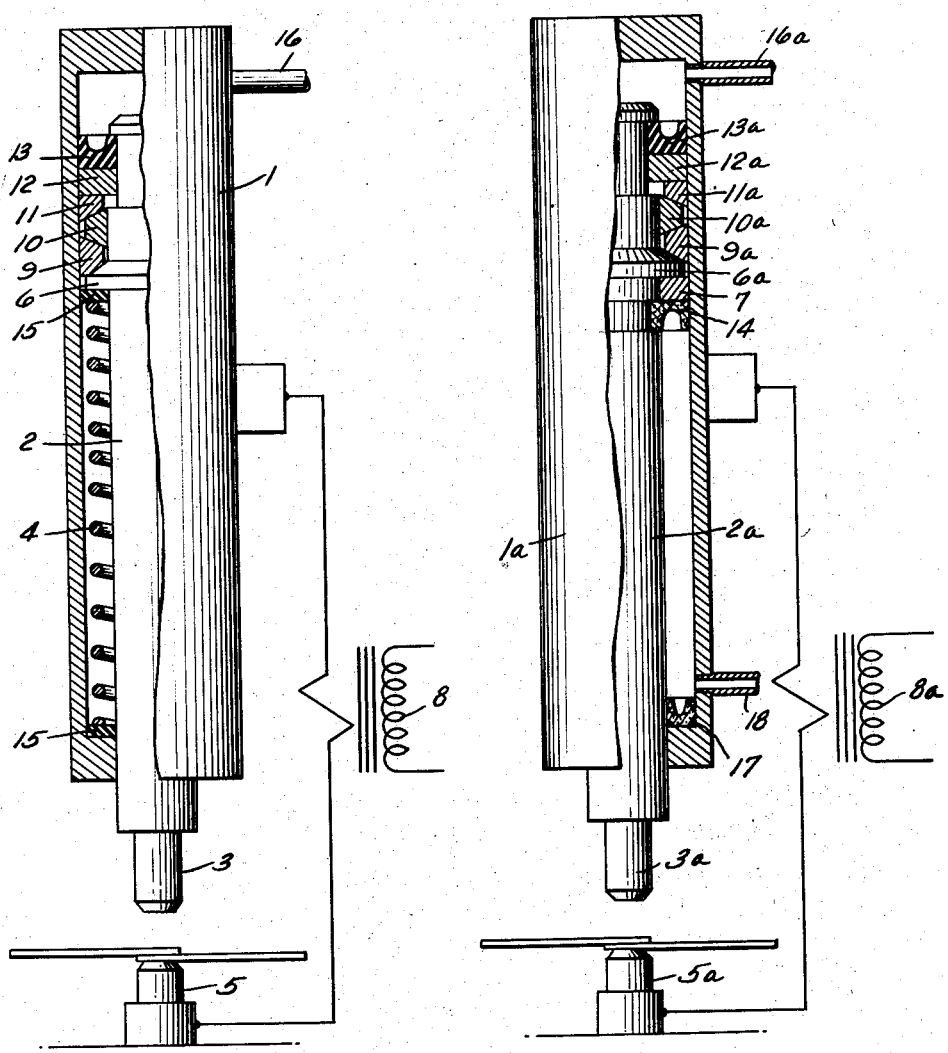

April 7, 1959

M. VLTAVSKY 2,881,403

SLIDING EXPANSION CONTACT DEVICE FOR SUPPLYING ELECTRIC
CURRENT FROM STATIONARY TO MOVING PARTS OF MACHINES

Filed Oct. 1, 1956

INVENTOR

Milan Vltavsky

BY Richard ◌◌◌
Ag't

United States Patent Office 2,881,403
Patented Apr. 7, 1959

2,881,403

SLIDING EXPANSION CONTACT DEVICE FOR SUPPLYING ELECTRIC CURRENT FROM STATIONARY TO MOVING PARTS OF MACHINES

Milan Vltavský, Bratislava, Czechoslovakia, assignor to ČKD Česká Lípa, národní podnik, Ceska Lipa, Czechoslovakia Application October 1, 1956, Serial No. 613,222

Claims priority, application Czechoslovakia October 5, 1955

8 Claims. (Cl. 339—9)

The present invention relates to a contact device for supplying electric current from stationary to moving parts of machines or other appliances operating with applied pressure.

In various machines or other appliances, which use electric current under simultaneous application of pressure for their operation, the electric current has to be supplied from a stationary part of the machine to a moving part thereof. Thus, in various types of presses or similar machines driven mechanically, pneumatically or hydraulically, such as welding presses, resistance stamping machines, spot or seam welding machines, electric current has to be transferred from a stationary part, for example, from a cylinder, to a moving part, for example, a piston rod carrying an electrode or jaws.

In the known machines of the above types, such a transmission of electric current from stationary to moving parts is usually carried out by means of flexible cables. Such flexible cables render the whole device rather intricate, and often interfere with the manipulation of the machine, apart from being a source of failures. Various slidable contacts loaded with a permanently acting pressure have also been used for this purpose. A permanently acting pressure force on the contact produces a permanent friction resistance during movement of the movable part relative to the stationary part, resulting in increased wear of the contact. However, even in this case the arrangement is relatively costly, interferes often with the manipulation of the machine or of the apparatus during the pressing, welding or other operation, or is a source of failures.

The present invention avoids the above disadvantages of the hitherto known devices, while serving to transmit of electric current from stationary to movable parts of the above named machines or appliances.

In accordance with this invention, a slidable expanding contact device is arranged directly between the electrically conductive stationary and movable parts of the machines or appliances using electric current and operating with applied pressure, and comprises a system of multi-part contact elements, for example, rings, rails or the like, of a trapezoidal or the like cross section. These contact elements rest against each other along conical or slanting plane surfaces. The system of contact elements abuts, with the contact element at one end, against a stationary part of the machine or of the apparatus, for example, against a fixed collar, while the contact element at the other end abuts against a slidable member, for example a ring, against which a sealing member, for example, a sealing ring, rests at the other side. The working pressure of the machine or apparatus acts directly on the sealing ring, so that it is only after the working pressure has been introduced, that the elements of the sliding expansion contact are compressed by the influence of the pressure on the sealing ring and on the sliding member, for example, the next adjacent ring, for the purpose of achieving a perfect contact between the individual elements and with the stationary and movable parts of the machine or apparatus. The force of the pressure acting against the elements of the slidable expansion device may be adjusted by the size of the surface of the slidable member which is directly subject to the working pressure of the machine or apparatus.

Two embodiments of the invention are hereinafter described in detail with reference to the accompanying drawing forming a part hereof, and wherein:

Referring to Fig. 1 in detail, the stationary part of the machine is represented by a cylinder 1 and the movable part by a piston rod 2 carrying an electrode 3 at its lower end. The transfer of the welding current from the stationary cylinder 1 to the movable piston rod 2, which is made of an electrically conductive material, is effected by a slidable expansion contact consisting, in this case, of three conductive contact rings, 9, 10 and 11 which are radially split and have trapezoidal cross sections, resting against each other along slanting plane surfaces. A bearing ring 12 rests against the end contact ring 11 and is axially slidable on the piston rod 2. Against the other side of the bearing ring 12 rests a sealing ring 13, which is adapted for axial sliding movement with the ring 12. The other end contact ring 9 of the slidable expansion contact is supported against a fixed collar 6 on the piston rod 2. In the embodiment of Fig. 1, the return movement of the piston rod 2 is effected by a spring 4 which, at its opposite ends, abuts against insulating rings 15 seating against the bottom of cylinder 1 and the underside of collar 6, respectively.

When pressure fluid is admitted into the upper working space of the cylinder 1 by way of a conduit 16, the piston rod 2 with the electrode 3 is extended axially from the cylinder until the electrode 3 abuts against the article to be welded, which is supported against the lower electrode 5. When the electrode 3 abuts against the article the pressure in the upper working space in the cylinder 1 rises to the adjusted value required for the welding. The sealing ring 13 with the bearing ring 12 is forced axially by this pressure against the end ring 11 of the slidable expansion contact device. As a result of the axial compacting of the contact rings 9, 10 and 11 between ring 12 and collar 6, the ring 11 is pressed radially against the inner surface of the wall of the cylinder 1, the ring 10 is pressed radially against the piston rod 2 and the end ring 9 is pressed radially against the wall of the cylinder 1. All of the rings 9, 10 and 11 are, at the same time, pressed against each other. In this way a perfect contact between the cylinder 1 and the piston rod 2 is achieved and the electric welding current from a transformer 8 proceeds then from the cylinder 1 over the rings 9, 10, 11 of the slidable expansion contact to the piston rod 2 and electrode 3. By an increase or decrease of the surface of the bearing ring 12 or of the sealing ring 12, subject to the pressure of the working fluid, the pressure acting on the elements of the slidable expansion contact device is adjusted, that is, increased or decreased.

When, after the completion of the working operation, the pressure in the upper working space of the cylinder 1 is released, the bearing ring 13 together with the sleeve ring 12 cease to exert axial pressure against the rings of the slidable expansion contact and the piston rod 2 returns without appreciable resistance to its basic or original position under the influence of the spring 4. The inclination of the slanting surfaces of the contact rings 9, 10 and 11 is chosen outside the range of self-locking action so as to avoid jamming of the contact rings during the return movement of the piston rod 2.

In the embodiment of the invention illustrated in Fig. 2, the spring 4 is eliminated, and the return or retracting movement of the piston rod is also effected by fluid under pressure admitted to the stationary cylinder. In Fig. 2, the parts corresponding to those described above with reference to Fig. 1 are identified by the same reference numerals, but with the letter "a" appended thereto, and, in addition thereto, there are provided a packing or seal 17 around the piston rod 2a at the bottom end of the cylinder 1a to prevent leakage of fluid under pressure out of the latter, a bearing ring 7 seating against the lower face of the collar 6a and a sealing ring or packing 14 at the underside of the bearing ring 7 so that, when fluid under pressure is admitted to the cylinder 1a below the sealing ring 14, for example, through a conduit 18, the fluid under pressure exerts an axially upward force on the sealing ring 14 which is transmitted by ring 7 to the collar 6a for retracting the piston rod 2a without causing axial compacting of the contact rings 9a, 10a and 11a.

The invention may be used for various presses and similar machines, which are driven mechanically, pneumatically or hydraulically and operate on the principle of utilization of a compressing force and electric current, such as welding presses, resistance stamping machines, spot welding, multipoint welding and seam welding machines, as well as for jigs for such machines, for example, for fixtures used for welding in presses and the like. The devices according to the invention are enclosed in the machine or apparatus and do not interfere with the manipulation thereof. A further advantage of devices according to the invention consists therein that the pressure of the expansion contact elements, for example, of its rings or rails may be adjusted to the compressing force, for example, to the force used for welding, so that when for example a higher welding current is used, requiring a higher compressing force, the pressure of the elements of the slidable expansion contact, that is, of the rings 9, 10 and 11 is automatically increased. This results from the fact that the increased pressure acting in cylinder 1 to provide the required higher compressing force for welding exerts a correspondingly increased axial force against the seating ring 13 and the bearing ring 12 for compacting the contact rings 9, 10 and 11 between collar 6 and bearing ring 12 with an increased pressure between the mutually contacting surfaces of the rings 9, 10 and 11. By reason of the sloping mutual contacting surfaces of the rings 9, 10 and 11, the increased axial compacting force produces increased radial forces urging the rings 9 and 11 against cylinder 1 and ring 10 against piston 2.

Although illustrative embodiments of the invention have been described in detail herein with reference to the accompanying drawing, it is to be understood that the invention is not limited to those precise embodiments, and that various changes and modifications may be effected therein without departing from the scope or spirit of the invention, except as defined in the appended claims.

I claim:

1. In a machine having a stationary part and a movable part and means for applying a force to cause displacement of said movable part relative to said stationary part; a contact device for supplying electric current from the stationary part to the movable part comprising a series of electric contact elements of substantially trapezoidal cross-section arranged successively in the direction of displacement of the movable part between the latter and the stationary part, said contact elements having mutual engaging surfaces which are inclined relative to said direction of displacement of the movable part so that, in response to compacting of said series of contact elements in said direction of displacement, the contact elements are urged alternately into intimate contact with the movable and stationary parts, respectively, in directions generally at right angles to said direction of displacement, means on the movable part engageable by the contact element at one end of said series generally in said direction of displacement of the movable part, and means engaging the contact element at the other end of said series and receiving the force for causing displacement of the movable part relative to the fixed part so that such force is transmitted to the movable part by way of said series of contact elements.

2. In a machine having a stationary cylinder and a piston rod slidable axially in the cylinder and carrying an electrode; a device for transmitting an electric current from the cylinder to the piston rod comprising an axially arranged series of conductive contact rings radially disposed between the cylinder and piston rod, said contact rings being radially split for radial expansion and contraction and the successive rings of said series tapering alternately inwardly and outwardly so that adjacent contact rings engage each other at frusto-conical surfaces and the contact rings are radially urged alternately against the cylinder and piston rod in response to axial compacting of said series of contact rings, a collar on the piston rod engaged by the contact ring at one end of said series, a piston member slidable on the piston rod and engageable axially against the contact ring at the other end of said series, and means for admitting fluid under pressure into the cylinder to exert a force axially against said piston member which is transmitted by way of said contact rings and collar to the piston rod for effecting axial displacement of the latter in one direction, while said axial force compacts said series of contact rings between said piston member and collar to urge the contact rings into intimate contact with each other and with the cylinder and piston rod for providing a conductive path for electric current from the cylinder to the piston rod.

3. In a machine having a stationary cylinder and a piston rod slidable axially in the cylinder and carrying an electrode; a device for transmitting an electric current from the cylinder to the piston rod as in claim 2, wherein said piston member includes a bearing ring slidable on the piston rod and abutting, at one side, against said contact ring at said other end of the series, and a sealing ring also slidable on the piston rod and extending between the latter and the cylinder, said sealing ring seating against the opposite side of said bearing ring.

4. In a machine having a stationary cylinder and a piston rod slidable axially in the cylinder and carrying an electrode; a device for transmitting an electric current from the cylinder to the piston rod as in claim 2, further comprising means for exerting a return force on the piston rod to displace the latter in the other axial direction while avoiding appreciable axial compacting of said series of contact rings.

5. In a machine having a stationary cylinder and a piston rod slidable axially in the cylinder and carrying an electrode; a device for transmitting an electric current from the cylinder to the piston rod as in claim 4, wherein said means for exerting a return force includes a compression spring interposed axially between said collar on the piston rod and the end of the cylinder toward which the piston rod moves in response to the axial force exerted by fluid under pressure admitted to the cylinder.

6. In a machine having a stationary cylinder and a piston rod slidable axially in the cylinder and carrying an electrode; a device for transmitting an electric current from the cylinder to the piston rod as in claim 4, wherein said means for exerting a return force includes a sealing ring around the piston rod at the side of said collar facing away from said series of contact rings, and means for admitting fluid under pressure to the cylinder to there exert an axial force against said sealing ring in the direction toward said collar.

7. In a machine having a stationary cylinder and a piston rod slidable axially in the cylinder and carrying an electrode; a device for transmitting an electric current from the cylinder to the piston rod comprising an axially arranged series of conductive contact rings radially disposed between the cylinder and piston rod, said contact rings being radially split for radial expansion and contraction and the successive rings of said series tapering alternately inwardly and outwardly so that adjacent contact rings engage each other at frusto-conical surfaces and the contact rings are radially urged alternately against the cylinder and piston rod in response to axial compacting of said series of contact rings, a collar on the piston rod engaged by the contact ring at one end of said series, a member slidable on the piston rod and engageable axially against the contact ring at the other end of said series, and means for applying an axial force against said member slidable on the piston rod in the direction toward said series of contact rings so that the latter transmit the axial force to said collar to cause axial displacement of the piston rod relative to the cylinder in one direction, while said contact rings are axially compacted and urged into intimate contact with each other and with the cylinder and piston rod to provide a conductive path for electric current between the cylinder and piston rod.

8. In a machine having a stationary cylinder and a piston rod slidable axially in the cylinder and carrying an electrode: a device for transmitting an electric current from the cylinder to the piston rod as in claim 7, further comprising means for exerting a return force on the piston rod to displace the latter in the other axial direction while avoiding appreciable axial compacting of said series of contact rings.

References Cited in the file of this patent

UNITED STATES PATENTS

| | | |
|---|---|---|
| 748,233 | Swan | Dec. 29, 1903 |
| 1,378,801 | Lamb | May 17, 1921 |
| 2,308,757 | Hulsberg | Jan. 19, 1943 |
| 2,480,858 | Hobbs | Sept. 6, 1949 |
| 2,772,100 | Kreissig et al. | Nov. 27, 1956 |

FOREIGN PATENTS

| | | |
|---|---|---|
| 495,553 | Belgium | Sept. 1, 1950 |